United States Patent [19]
Lee

[11] Patent Number: 5,241,268
[45] Date of Patent: Aug. 31, 1993

[54] METHOD AND APPARATUS FOR ELECTROMAGNETICALLY RESOLVING THE ANGLE OF A ROTATABLE SHAFT

[75] Inventor: Jeffrey L. Lee, Los Angeles, Calif.

[73] Assignee: Hughes Aircraft Company, Los Angeles, Calif.

[21] Appl. No.: 844,017

[22] Filed: Mar. 2, 1992

[51] Int. Cl.⁵ .............................................. G01B 7/30
[52] U.S. Cl. .............................. 324/207.25; 364/559; 324/207.17
[58] Field of Search ...................... 324/207.11, 207.15, 324/207.16, 207.22, 207.23, 207.24, 207.25, 207.26, 207.18, 207.19, 226, 232, 233, 236, 234, 239, 243; 364/726, 553, 559, 560, 576

[56] References Cited

U.S. PATENT DOCUMENTS

| | | | |
|---|---|---|---|
| 4,829,250 | 5/1989 | Rotier | 324/207.26 |
| 4,845,429 | 7/1989 | Burreson | 324/207.19 |
| 4,847,556 | 7/1989 | Langley | 324/207.18 |
| 4,967,153 | 10/1990 | Langley | 324/207.26 |
| 5,130,866 | 7/1992 | Klaassen et al. | 324/207.22 |

*Primary Examiner*—Gerard R. Strecker
*Assistant Examiner*—Warren S. Edmonds
*Attorney, Agent, or Firm*—Gordon R. Lindeen, III; Wanda K. Denson-Low

[57] ABSTRACT

A method and apparatus for determining the angle of a shaft (16) of an electromagnetic resolver which has resolver windings (10, 12) is disclosed. The sine and cosine resolver winding signals (30, 32) are sampled at a frequency significantly greater than the resolver drive signal. A fast fourier transform (38, 40) is then applied to the winding signals. The polarity of the drive signal (42) is applied to the FFT output (44, 46) and the results are divided one into the other (52) to obtain the arctangent of the shaft angle (56). Using a multiplexer (22) the apparatus can be coupled to a large number of different electromagnetic resolvers.

13 Claims, 1 Drawing Sheet

METHOD AND APPARATUS FOR ELECTROMAGNETICALLY RESOLVING THE ANGLE OF A ROTATABLE SHAFT

FIELD OF THE INVENTION

The present invention pertains to the field of electromagnetic resolvers and in particular to a method and apparatus for determining resolver shaft angle using fast fourier transforms.

BACKGROUND OF THE INVENTION

In order to determine the angle of a shaft actuated by a hydraulic or electro-mechanical device, resolvers with windings mechanically coupled to the shaft of interest are commonly used. A resolver winding drive circuit provides an alternating current (AC) carrier as excitation for the resolver's primary winding on the shaft which stimulates a voltage in the resolver's fixed secondary windings. Usually, a resolver designed for precise shaft angle measurements has, at least, two secondary windings. One of the windings represents the sine function of the carrier's amplitude, the other represents the cosine function of the amplitude. It is preferred to consolidate the circuitry that receives and demodulates signals from the resolver output windings with the circuitry that interprets the amplitudes so that the circuitry can be used for a number of different resolvers. In order to accurately determine the angle of the shaft, it is necessary to amplitude demodulate each signal and compare the phase of the output winding signals with the phase of the drive signal to determine the polarity of their amplitudes. In many resolvers, this has been done by using special compensation windings which require complex supporting circuitry to precisely monitor or maintain the phase relationships. In resolvers that are not equipped with compensation windings, the resolver driver's phase is usually precisely monitored. One problem often faced in demodulating the resolver output winding signals is that they are contaminated with noise or transients that are either self-generated or coupled with other electrical devices such as motors and high-speed digital equipment. Filters are required to eliminate as much noise as possible and these filters have an undesirably long settling time. The settling time is particularly important if a number of different shafts are coupled to a single resolver circuit through a multiplexer because it increases the amount of time required to determine the angle of each shaft. The filters often require a large number of expensive high precision passive components.

SUMMARY OF THE INVENTION

The present invention makes it possible to precisely determine the angle of a rotable shaft at less cost and using far fewer high precision components than existing systems. Noise is essentially ignored and settling times are greatly reduced. In one embodiment, the invention encompasses a method for determining resolver shaft angle using sine and cosine resolver winding signals that are stimulated by a resolver drive signal. The sine and cosine resolver winding signals are sampled at a frequency significantly greater than the resolver drive signal, preferably for approximately one cycle period of the signal. A fourier transform is applied to the sampled sine winding and cosine winding signals. The polarity of the drive signal at the time of each winding sample is determined. The drive signal polarity is then applied to the fourier transforms of the winding signals to obtain fourier transform signals with polarity. The fourier transform signals with polarity are then divided one into the other to obtain a trigonometric function of the shaft angle. For example, if the sine winding signal is divided by the cosine winding signal for a transform signal with polarity, an arctangent of the shaft angle will be obtained. Finally, the shaft angle is calculated from the trigonometric function. The method can be applied to one set of resolver windings or, using a multiplexer, to the windings of many resolvers.

DETAILED DESCRIPTION OF THE INVENTION

Figures 1, 2:
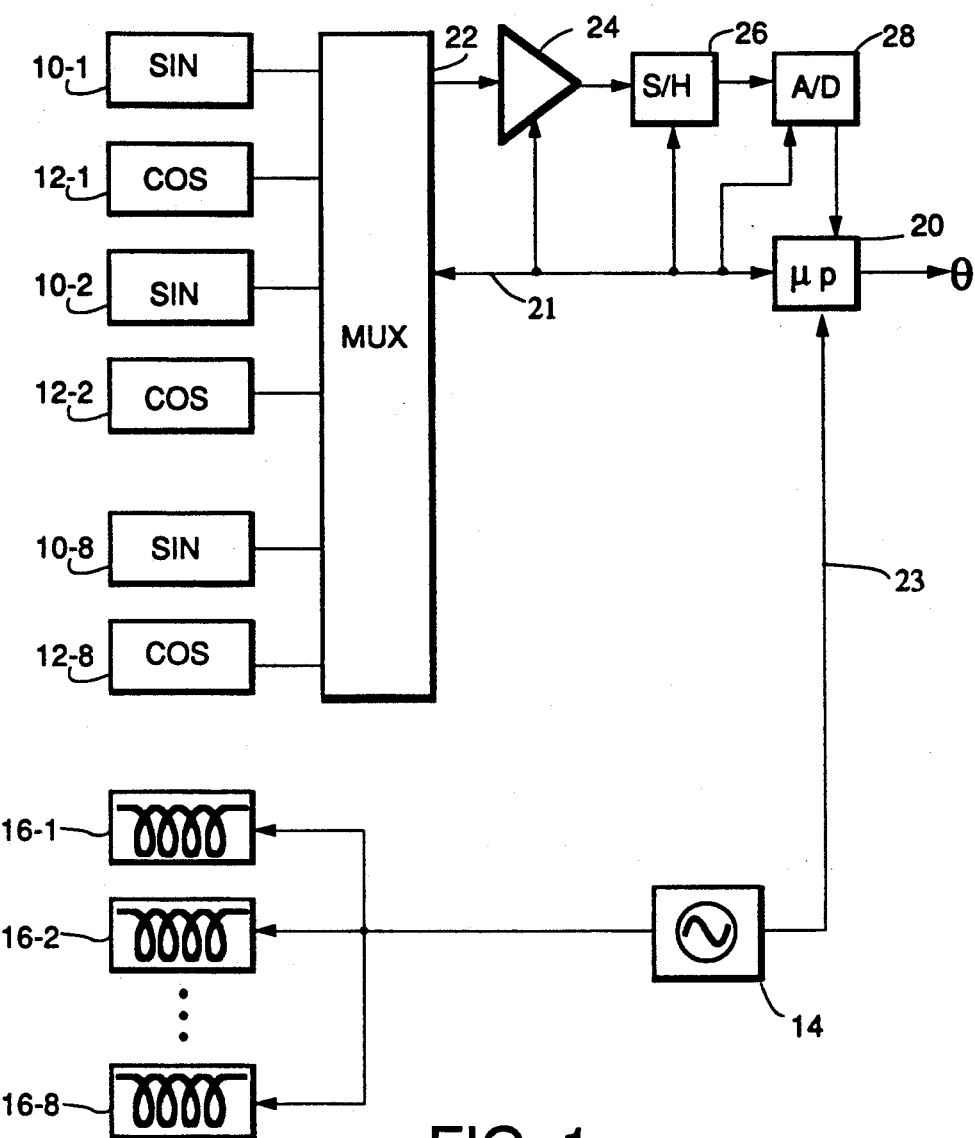
FIG. 1 is a block diagram of a shaft angle determining system for a plurality of resolver windings.
FIG. 2 is a block diagram of a method incorporating the present invention.

A typical resolver that is made to measure shaft position precisely will have at least one pair of fixed secondary resolver windings referred to as a sine winding and a cosine winding which are in close proximity to the primary winding on the rotable shaft of the resolver. When an alternating current drive signal is sent to the primary winding, it stimulates an alternating current signal in the secondary resolver windings which can then be used to determine the position of the shaft. While the present invention is illustrated as being particularly adapted for this type of resolver winding arrangement, it can also be applied to a variety of different resolver winding constructions. In the embodiment of FIG. 1, the present invention is coupled to a plurality of sine resolver windings 10-1 to 10-8 from a plurality of different resolvers in this case eight, and a corresponding cosine resolver winding 12-1 to 12-8 from the same group of eight electromagnetic resolvers through a multiplexer 22. A resolver drive circuit 14 supplies an alternating current directly to the primary windings of each resolver 16-1 to 16-8 in parallel. All resolvers are excited simultaneously in this manner.

The operation of the entire system is controlled by a conventional microprocessor 20. The microprocessor first selects a particular resolver output for which the shaft angle is to be determined by instructing the multiplexer 22. The frequency and timing of the resolver drive circuit 14 is preferably independently controlled. The drive circuitry 14 provides phase information to the microprocessor by generating a clock that is synchronized to the drive circuit output and supplied to the microprocessor on clock line 23. It is presently preferred that the alternating current drive signal be at a frequency of two kilohertz (KHz); however, other frequencies may be used depending on the application. The corresponding resolver windings (e.g. 10-1, 12-1) are coupled to an integrational amplifier 24 through multiplexer 22 in sequence as commanded by the microprocessor. The multiplexer couples the corresponding windings through the amplifier to circuitry that arithmetically processes the signals from the sine winding and the cosine winding. It is preferred to first digitize the resolver windings' signal for one signal period and then process the information using a fast fourier transform (FFT). In essence, the microprocessor performs as a spectrum analyzer with the added capability of determining the sign of the amplitude using the driver circuit's synchronization signal from clock line 23.

When switching from one resolver output to another, the signal can become corrupted by charge transfer transients from the multiplexer and by operational amplifier output voltage settling. The signals can also be contaminated by electrical noise coming from motors and electrical systems external to the resolver windings. The FFT maps the magnitude of the winding signals from the time domain into the frequency domain. The FFT filters the undesirable noise by allowing the microprocessor to look only at the magnitude at the specific carrier frequency of the desired resolver output signals (in this case two KHz). Accordingly, only transients and noise at the resolver winding frequency can corrupt the magnitude determination which is used in the basic trigonometric function of determining shaft angle. The effects of any noise can be further diminished by increasing the size of the sample processed by the FFT filter.

The amplifier 24 isolates the multiplexers and windings from downstream circuitry and applies a gain to the signal to make it easier to manipulate. From the amplifier, the signal is transferred to a sample and hold circuit 26 as is well known in the art. The sample and hold circuit is directly connected to an analog to digital (A to D) converter 28. The timing of the sample and hold circuit and the A to D converter are controlled by the microprocessor via the control bus 21. The sample and hold circuit may be replaced with a track and hold function to suit specific applications. The sample and hold filter also preferably includes a low pass filter. Preferably one signal period i.e. an entire cycle of the two KHz carrier is sampled to ensure that the microprocessor has enough information to perform its functions. The A to D converter is preferably a conventional 12 bit high speed converter with a sampling rate approximately two orders of magnitude faster than the drive signal frequency. In this case, with a two KHz drive signal frequency, a sampling rate of at least 500 KHz is preferred. It is important that the A to D D converter have high linearity and precision in order to obtain a precise determination of the shaft angle. The bit length of the A to D converter can be reduced in applications where high accuracy in shaft angle is not important. The samples from the A to D converter are received by the microprocessor which then performs a fourier transform on each signal. Preferably, the multiplexer is driven to switch from the sine winding to the cosine winding after each respective complete cycle and any additional time required for settling of the sample and hold circuit and amplifier circuits. With a two KHz drive signal an accurate measurement of shaft angle should be obtainable after no more than four microseconds plus any additional time required for the microprocessor to make its calculations.

FIG. 2 shows the flow of the processing performed by the hardware of FIG. 1. While FIG. 2 shows parallel processing for sine and cosine winding signals, the signals are preferably processed serially using the multiplexer 22 as shown in FIG. 1. This minimizes the amount of hardware required while still providing adequate precision for most applications. However, a variety of different hardware implementations are possible. As shown in FIG. 2 the sine and cosine resolver winding signals 30, 32 for one resolver are first individually digitized 34, 36 and then a fast fourier transform (FFT) is performed 38, 40. Any of the variety of known FFT algorithms may be applied to perform this step. The FFT output signals are then filtered 44, 46 to remove all frequencies other than the resolver circuit frequency, in this case two KHz. The polarity of the incoming sine and cosine signals is lost in the FFT process. The resolver drive signal 42 is then used to determine the polarity of the resolver drive signal associated with the filtered FFT sine and cosine secondary winding signals respectively 48, 50. It is preferred that the microprocessor simply notes the polarity received on the clock line 23 at the corresponding sampling time and then applies the polarity later after the filtering. Noting the polarity of the resolver drive signal at the time of sampling allows a polarity to be applied to the frequency spectrum FFT output. The magnitudes of these signals are then applied to a divider 52. The divider preferably divides the sine magnitude at the carrier frequency by the cosine magnitude to obtain the arctangent of the shaft angle. An inverse arctangent operation is then performed on this result to obtain the actual shaft angle 56. The FFT, filtering, polarity detection and application, the division, and the arctangent operations are all performed by the microprocessor.

By using a single amplifier, a single sample and hold circuit and a single analog to digital converter, gain errors through that loop can be ignored. When the sine and cosine magnitude values are divided into each other, gain errors cancel out. The preferred embodiment similarly ignores any DC offsets. However, parallel processing may be used for greater speed. Most random noise is reduced and system and switching transient noise which does not occur at the drive circuit frequency is ignored. Accordingly, the present invention allows for a very high resolution determination of a shaft angle without the need for a complex arrangement of filters and compensation circuits. The invention can be applied to rotable shafts in a large variety of applications but is particularly suited to applications where high speed, high accuracy determinations are required. The invention can be applied to a single rotable shaft or, through multiplexers, to any number of shafts, the only limitation being the frequency with which an angle determination is required for each shaft. While only a single embodiment has been described above, it will be apparent to those skilled in the art that a variety of modifications and adaptations can be made without departing from the scope of the present invention. The scope of the present invention is not to be limited to the embodiment described above but only by the following claims.

What is claimed is:

1. A method for determining a shaft angle using signals produced by sine and cosine resolver windings associated with the shaft comprising:

stimulating the sine and cosine windings using a resolver drive signal;

sampling the sine winding signal and cosine winding signal at a frequency that is greater than the resolver drive signal frequency;

applying a Fourier transform to the sine winding signal sample and to the cosine winding signal sample;

determining the polarity of the drive signal at the time of each winding sample;

applying the drive signal polarity to the Fourier transforms of the winding signal samples to obtain Fourier transform samples with polarity;

dividing the Fourier transform samples with polarity one into the other to obtain a trigonometric function of the shaft angle; and calculating the shaft angle from the trigonometric function.

2. The method of claim 1 wherein the step of dividing comprises dividing the fourier transform sine signal by the fourier transform cosine signal to obtain an arctangent of the shaft angle.

3. The method of claim 1 wherein the step of sampling the winding signals comprises sampling the winding signals at a rate two orders of magnitude greater than the frequency of the winding signals.

4. The method of claim 1 wherein the step of sampling the winding signals comprises applying the winding signals each to a sample and hold circuit and sampling the value stored in each sample and hold circuit at a defined sampling rate.

5. The method of claim 4 wherein the winding signals are analog and the step of sampling the value stored in the sample and hold circuit comprises converting the stored values to digital form.

6. A resolver for determining the angle of a rotable shaft comprising:

a sine winding and a cosine winding associated with the shaft;

a resolver primary winding associated with the shaft, one of either the primary winding or the sine and cosine windings being connected to the shaft so that the relative positions of the windings are indicative of the shaft angle;

a resolver winding drive circuit for generating a drive signal and supplying it to the primary winding to stimulate winding signals in the sine and cosine windings that are indicative of the shaft angle;

a sampler for sampling the sine and cosine winding signals;

means for determining the Fourier transform of the winding signal samples;

means for determining the polarity of the drive circuit drive signal for each sample and applying that polarity to the Fourier transforms of the winding signal samples;

a divider for dividing the Fourier transforms with applied polarity one into the other to obtain a trigonometric function of the shaft angle; and means for calculating the shaft angle from the trigonometric function.

7. The resolver of claim 6 wherein the sampler comprises a sample and hold circuit.

8. The resolver of claim 6 wherein the sampler comprises an analog to digital converter.

9. The resolver of claim 8 wherein the drive signal has a defined frequency and the sampler samples the winding signals at a rate two orders of magnitude greater than the frequency of the winding signals.

10. The resolver of claim 6 wherein the means for determining the fourier transform, the means for determining the polarity of the drive circuit drive signal, the divider and the means for calculating the shaft angle comprise a microprocessor.

11. The resolver of claim 10 wherein the microprocessor generates timing signals for controlling the sampler's sampling rate.

12. The resolver of claim 6 further comprising a multiplexer coupled between the windings and the sampler and further coupled to other sine and cosine windings that are in electrical communication with other rotable shafts for coupling the sampler to a plurality of different sets of sine and cosine windings.

13. The resolver of claim 12 wherein the means for determining the fourier transform, the means for determining the polarity of the drive circuit drive signal, the divider and the means for calculating the shaft angle comprise a microprocessor and wherein the microprocessor generates timing signals for controlling the multiplexer.

* * * * *